US006648078B1

(12) United States Patent
Moffett et al.

(10) Patent No.: US 6,648,078 B1
(45) Date of Patent: Nov. 18, 2003

(54) APPARATUS FOR FOLDING OVER CORN STALK STUBBLE AND THE LIKE

(76) Inventors: Marvin G. Moffett, 9732 S. 550 West, Lafayette, IN (US) 47909; Richard P. Swank, 9839 W. 650 South, Westpoint, IN (US) 47992; Scott C. Miller, 7724 S. 700 West, Westpoint, IN (US) 47992; Jeremy Miller, 9142 S. 550 West, Lafayette, IN (US) 47909

( * ) Notice: Subject to any disclaimer, the term of this patent is extended or adjusted under 35 U.S.C. 154(b) by 0 days.

(21) Appl. No.: 09/618,676

(22) Filed: Jul. 19, 2000

(51) Int. Cl.[7] .......................... A01B 59/048; E02F 3/12; E02F 3/64; E02F 3/76
(52) U.S. Cl. ........................ 172/788; 172/273; 172/833; 172/308; 172/776
(58) Field of Search .............................. 172/297, 306, 172/308, 611, 612, 776, 134, 272, 273, 810, 833, 781, 780, 795, 788, 783, 796, 797, 779, 799.5

(56) References Cited

U.S. PATENT DOCUMENTS 3,595,295 A  * 7/1971 Curry ........................ 157/13
3,780,785 A  * 12/1973 Schultz et al. ............. 157/1.24
6,324,775 B1 * 12/2001 Harnois et al. ......... 172/781 X

* cited by examiner

Primary Examiner—Christopher J. Novosad
(74) Attorney, Agent, or Firm—Woodard, Emhardt, Moriarty, McNett & Henry LLP

(57) ABSTRACT

The present invention relates to a device which may be mounted to the front of a tractor and which is operative to fold over corn stalks and the like before they engage the front tires of the tractor. The device positions dragging units in front of each of the front tires of the tractor, whereby the dragging units are dragged over the ground in front of the tires when the tractor is moving. The weight of each of the dragging units is sufficient to cause it to substantially fold over corn stalks and the like prior to their engagement with the front tires of the tractor, thereby greatly minimizing wear to the tires caused by engagement with the corn stalks and the like.

16 Claims, 8 Drawing Sheets

APPARATUS FOR FOLDING OVER CORN STALK STUBBLE AND THE LIKE

TECHNICAL FIELD OF THE INVENTION

The present invention generally relates to farm implements, and more particularly, to an apparatus for folding over corn stalk stubble and the like.

BACKGROUND OF THE INVENTION

It is widely recognized that farming is a capital-intensive business. It is not unusual for farm tractors to cost more than $100,000 and for tires for such tractors to cost $3,000 a piece. In the past, tractor tires would generally be run at an inflation of 18–20 pounds per square inch. Modern tractor tires are designed to run on a lower air pressure (approximately 7–10 pounds per square inch), thereby allowing the tires to flatten out and minimize soil compaction as the tractor traverses the field. Lower compaction reduces damage to plant roots and facilitates water drainage by the soil. Manufacturers rate such tires to have a normal life of approximately 3,000 hours of operation.

In recent years, no-till farming has become common practice in the United States. No-till farming practices seek to control soil erosion by not plowing fields after the crop has been harvested. The U.S. Government mandates no-till on some lands, and most other farmers have adopted the practice, realizing that it is beneficial to reducing soil erosion and that it minimizes the number of times that the farmer is required to run over his fields during a growing season.

Prior to no-till farming practices, a corn crop (for example) would be harvested and the corn stalk stubble left in the field would be plowed under in the fall. The field would then be replanted again the following spring. Under the no-till methodology, the corn stalk stubble is not plowed under in the fall and the new crops are planted directly over the stubble-laden field the following spring. This means that the corn stalk stubble cures in the field all winter, allowing its water content to be purged, resulting in an extremely stiff stalk. Measurements have shown that the hardness of such cured stalks ranges between 75–95 on the Rockwell scale, whereas the newer low-pressure tires exhibit a hardness of 68–72 Rockwell. The result is that the corn stalk stubble can produce significant wear when the tractor is driven over it in the spring to plant a new crop. In tests performed by the present inventors, cords were visible through the tire tread after just 60 hours of operation under such conditions. Although corn is the principle crop in the United States that causes such accelerated wear, it will be appreciated that the same problem is exhibited to a greater or lesser degree with any crop that leaves a plant-stem stubble after harvesting.

There is therefore a need for a device that will minimize tire wear resulting from driving over corn stalks and the like. The present invention is directed toward meeting this need.

SUMMARY OF THE INVENTION

The present invention relates to a device which may be mounted to the front of a tractor and which is operative to fold over corn stalk stubble and the like before they engage the front tires of the tractor. The device positions dragging units in front of each of the front tires of the tractor, whereby the dragging units are dragged over the ground in front of the tires when the tractor is moving. The weight of each of the dragging units is sufficient to cause it to substantially fold over .corn stalk stubble and the like prior to their engagement with the front tires of the tractor, thereby greatly minimizing wear to the tires caused by engagement with the corn stalk stubble and the like.

DETAILED DESCRIPTION OF THE PREFERRED EMBODIMENT

Figure 1:
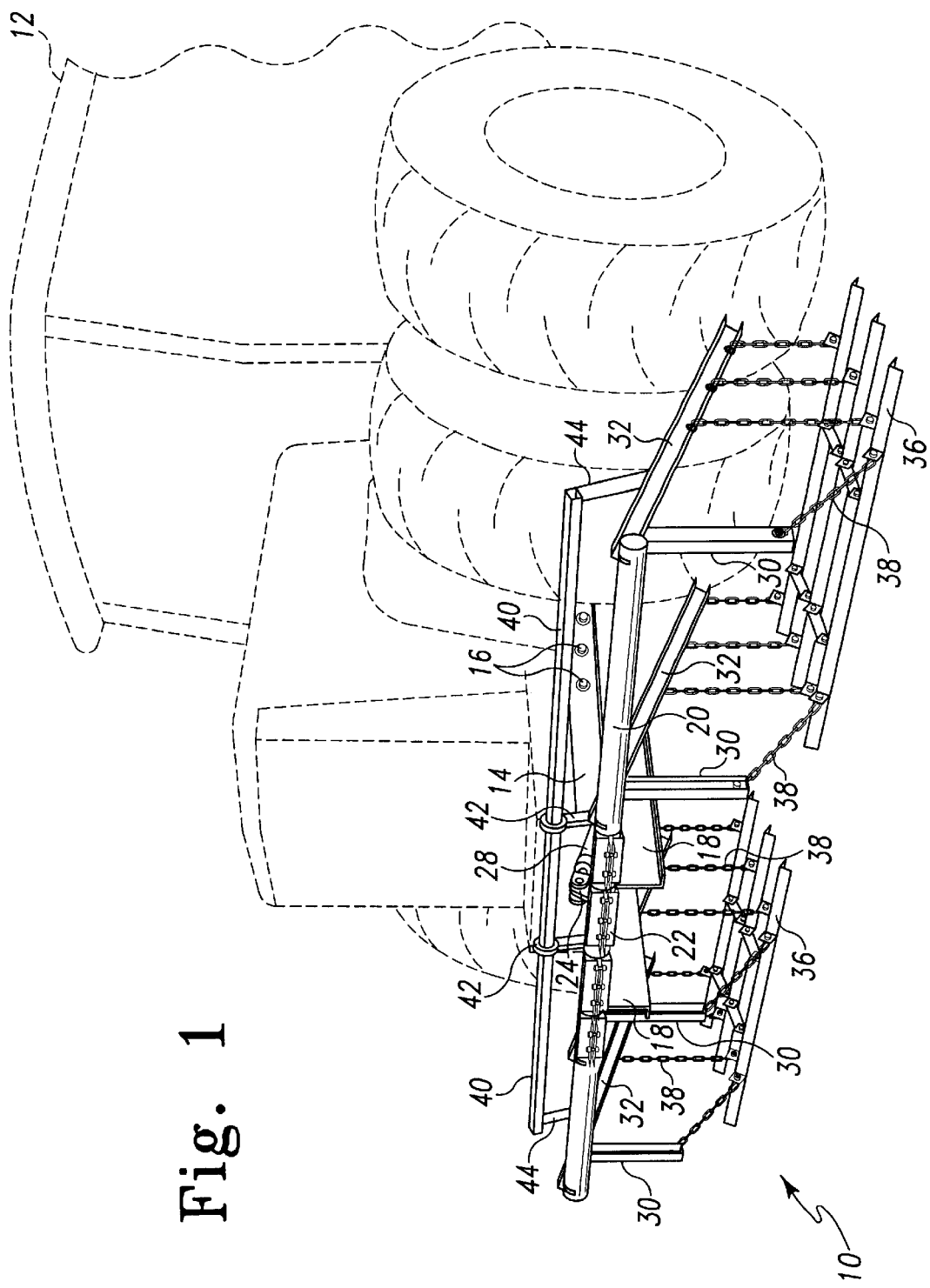
FIG. 1 is a perspective view of a preferred embodiment of the present invention, attached to the front of a tractor.

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

FIG. 1 illustrates a preferred embodiment of the present invention, indicated generally at 10. The apparatus 10 is shown coupled to a tractor 12. Preferably, a mounting panel 14 is bolted to either side of the front end of tractor 12 using bolts 16 extending through a portion of the tractor 12 frame. A support member 18, preferably comprising C-channel iron, is welded to each of the mounting panels 14 and extends approximately 18 inches in front of the tractor 12. Preferably, a C-channel cross brace 19 is coupled between the support members 18 (see FIG. 2).

Extending across the front of the tractor 12 and above the support members 18 is a crossbar 20. Crossbar 20 is attached to the support members 18 by means of pairs of semi-cylindrical brackets 22 bolted together via pieces of angle-iron welded to the exterior of each of the brackets 22. In certain embodiments, the lower portions of the brackets 22 are welded directly to the support members 18. In certain other embodiments, the brackets 22 are affixed to the support members 18 by welding the exterior pieces of angle-iron to the support member. The brackets 22 define a cylindrical hole which contains a portion of the crossbar 20, thereby preventing the crossbar 20 from translating with respect to the brackets 22, but permitting the crossbar 20 to rotate. In certain preferred embodiments the brackets 22 are formed from section of iron pipe split along its axis of symmetry. The brackets 22 preferably include grease ports to permit the injection of grease, both to lubricate the crossbar 20, and to protect the crossbar 20 and brackets 22 from oxidation or corrosion.

Figure 2:
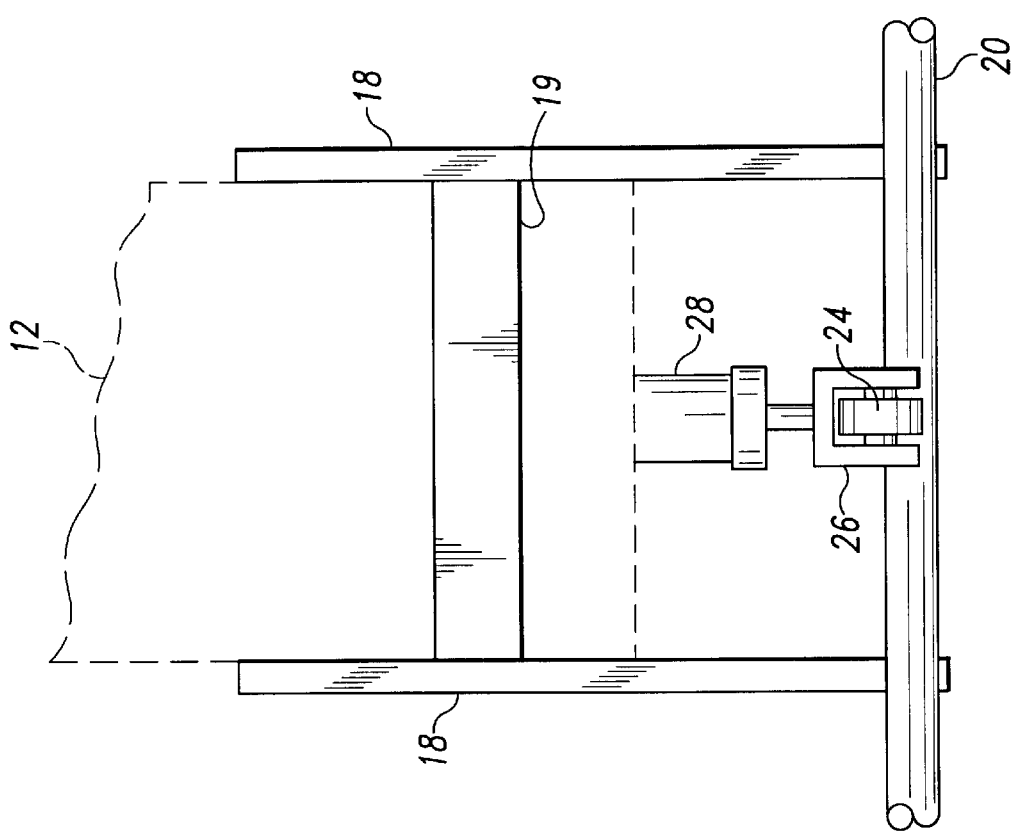
FIG. 2 is a partial top plan view of the preferred embodiment of the present invention attached to a tractor.

As more clearly seen in FIG. 2, the crossbar 20 includes a flange 24 extending therefrom. The flange 24 has a hole (not shown) formed therethrough. The flange 24 forms a rotatable coupling with a coupler 26 mounted to the end of a hydraulic cylinder 28. A proximal end of the hydraulic cylinder 28 is mounted to the front of the cross brace 19, while a distal end of the hydraulic cylinder 28 is mounted to the coupler 26. The coupler 26 is mounted to the flange 24 by means of a rod, bolt, or the like extending through the hole in the flange 24. As will be appreciated by those having ordinary skill in the art, extension of the hydraulic cylinder 28 acts upon the flange 24 to cause the crossbar 20 to rotate within the pipe sections held by the brackets 22.

Returning now to FIG. 1, the crossbar 20 includes four lead arms 30 extending therefrom (although the present invention comprehends a lesser or greater number of lead arms). Lead arms 30 preferably extend downwardly toward the ground. Lead arms 30 are further preferably formed from C-channel iron and are welded to the crossbar 20. Four trailing arms 32 are also preferably formed from C-channel iron and welded to the crossbar 20. Trailing arms 32 preferably extend back toward the tractor 12 and only slightly downwardly.

A pair of drag units 36 are suspended from the lead arms 30 and trailing arms 32 by means of a plurality of connecting members 38 connected therebetween. Although the preferred embodiment of the present invention utilizes chains as the connecting members 38, it will be appreciated by those having ordinary skill in the art that any resilient connecting member that is substantially perfectly compressible may be used. A perfectly compressible connecting member is one which exerts no force in opposition to compression along the axis defined by the points at which it connects to the elements being connected. Therefore, the drag units 36 exert a downward force upon the ground which is substantially proportional only to the weight of the drag unit 36. In a preferred embodiment of the present invention, each of the drag units 36 is coupled to two of the lead arms 30 by means of two chains 38, while each of the drag units 36 is coupled to two of the trailing arms 32 by means of six chains 38.

A stop bar 40 is mounted above and slightly behind the crossbar 20 upon a pair of stop bar elevating brackets 42, each welded to a respective support member 18. A gauge 44 extends downwardly from either end of the stop bar 40. Preferably, each gauge 44 is positioned just inside each of the outside trailing arms 32.

In operation, the apparatus 10 is positioned in the down position (as illustrated in FIG. 1) and the tractor 12 is moved forward across the field. In the down position, each of the drag units 36 lays upon the ground solely by virtue of its own weight. In the preferred embodiment of the present invention, each drag unit 36 weighs approximately 60 pounds. The connecting members 38 limit the range of motion of the drag unit 36 with respect to the crossbar 20, however they do not exert any downward or upward force upon the drag unit 36 when the apparatus 10 is in the down position. As the tractor 12 moves forward across the field, the connecting members 38 extending between the lead arms 30 and the drag unit 36 limit the rearward (i.e. toward the tractor 12) movement of the drag unit 36, so that it does not interfere with the tires of the tractor 12. In order to assure that the drag unit does not interfere with the wheels of the tractor, the connecting members 38 are preferably anchored to the lead arms 30 or trailing arm 32 at a point further away from any point where the wheels contact the ground than the sum of the length of the connecting members 38 plus the length of the drag unit 36. This way, even if the trailing edge of the drag unit 36 is pulled as far back towards the Wheels as possible, such that the entire length of the connecting member 38 and the drag unit 36 form a straight line, causing the drag unit to be lifted off the ground along most or all of it's length, the drag unit still cannot get between the tires and the ground.

During forward movement, the leading edge of each drag unit 36 is the leading edge of the tractor 12/10 and is therefore the first part of the device to come into contact with the corn stalk stubble sticking up in the field. Because of the substantial weight of the drag unit 36, interaction between the drag unit 36 and the corn stalk stubble results in the corn stalk stubble being folded over in a direction facing away from the tractor 12. When the wheels of the tractor 12 eventually reach the folded over corn stalk stubble, the stubble does not poke into the surface of the tires and therefore wear to the tires is substantially eliminated.

As will be familiar to those skilled in the art, tractors are generally constructed to be able to move in at least two directions—forward and in reverse—in order to improve their mobility. Typically, the wheel arrangement, driver position, and the positioning of other elements all define a forward direction of motion. Thus, although the apparatus 10 is preferably coupled to the tractor 12 so as to place the mounting panels 14, and the drag units (shown as 36 in FIG. 3) forward of the tires, in certain alternative embodiments the apparatus 10 is coupled to the tractor 12 so as to place the drag units 36 behind the tires. In these embodiments, the apparatus 10 would clear corn stubble and the like when the tractor was moved in reverse, so that the preferred direction of motion would be towards the rear of the tractor.

Figure 3:
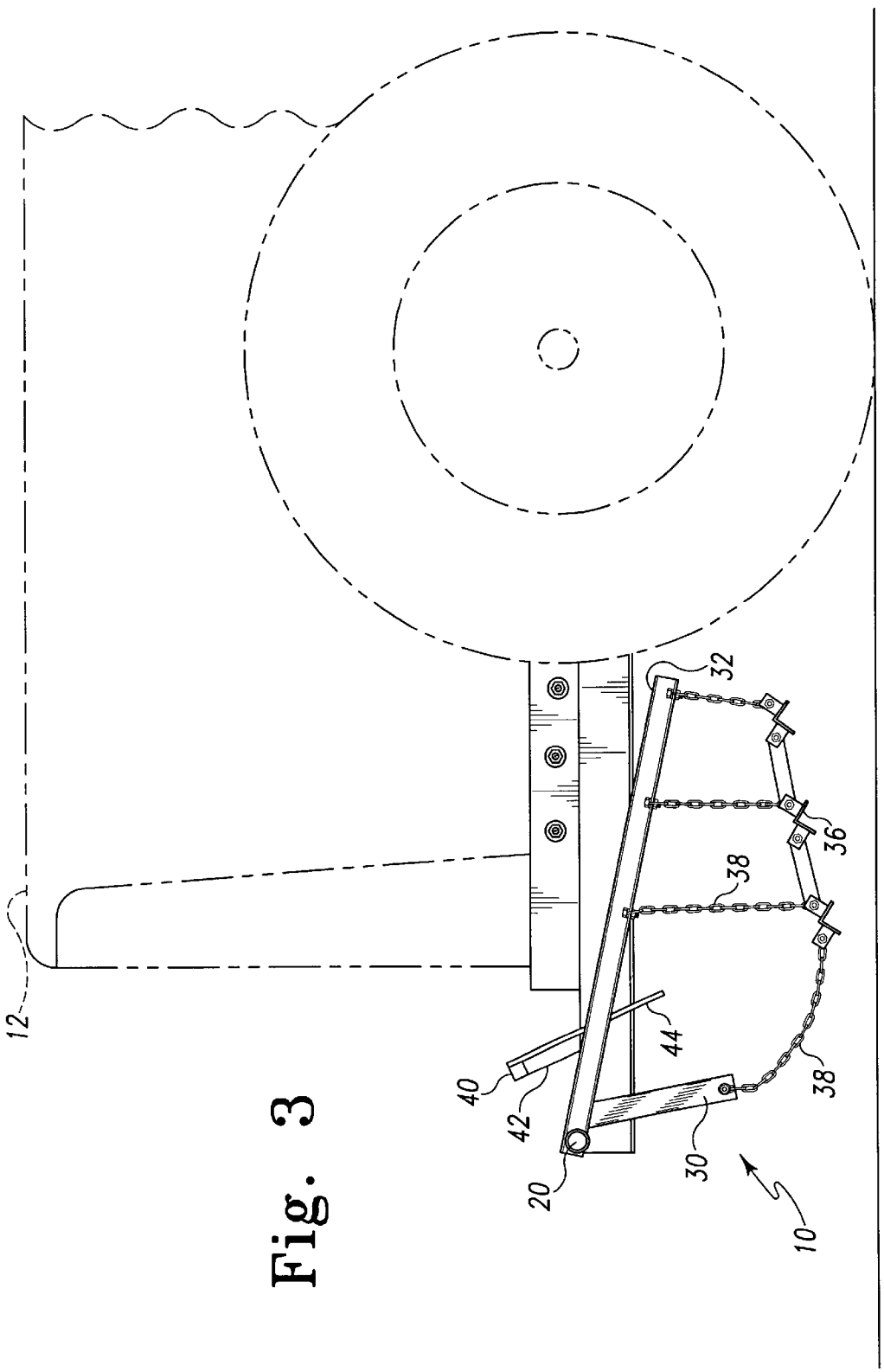
FIG. 3 is a side-elevational view of the preferred embodiment of the present invention attached to a tractor, and shown in the raised position.

With reference now to FIGS. 2 and 3, the apparatus 10 may be lifted off of the ground by extension of the hydraulic cylinder 28 (preferably controlled from inside the tractor 12). Extending the hydraulic cylinder 28 causes the flange 24 on the upper surface of crossbar 20 to be rotated away from the tractor 12. This causes rotation of the crossbar 20, which in turn causes rotation of the trailing arms 32 away from the ground. Because the distance between the drag unit 36 and the trailing arms 32 is limited by the connecting members 38, sufficient rotation of the crossbar 20 causes the drag unit 36 to be lifted off of the ground. In the case of tractors 12 having large front wheels (such as that illustrated in the drawings), it is generally not possible for the operator of the tractor 12 to directly view the drag units 36. The gauge bar 44 is therefore provided at a location that is visible to the operator of the tractor 12. By viewing the location of the outboard trailing arm 32 with respect to the gauge bar 44, the operator of the tractor 12 is able to easily determine the extent of raising or lowering of the drag unit 36. Preferably, the gauge 44 includes an upper marking indicating the proper raised position, and a lower marking indicating the proper lowered position of the apparatus 10. It is preferable that the upper marking be chosen at a position which will prevent excessive pressure being placed on the hydraulic cylinder 28 in order to prevent bending of the hydraulic cylinder 28 components. The apparatus 10 is illustrated in raised position in FIG. 3, and the lowered position in FIG. 4.

Figure 4:
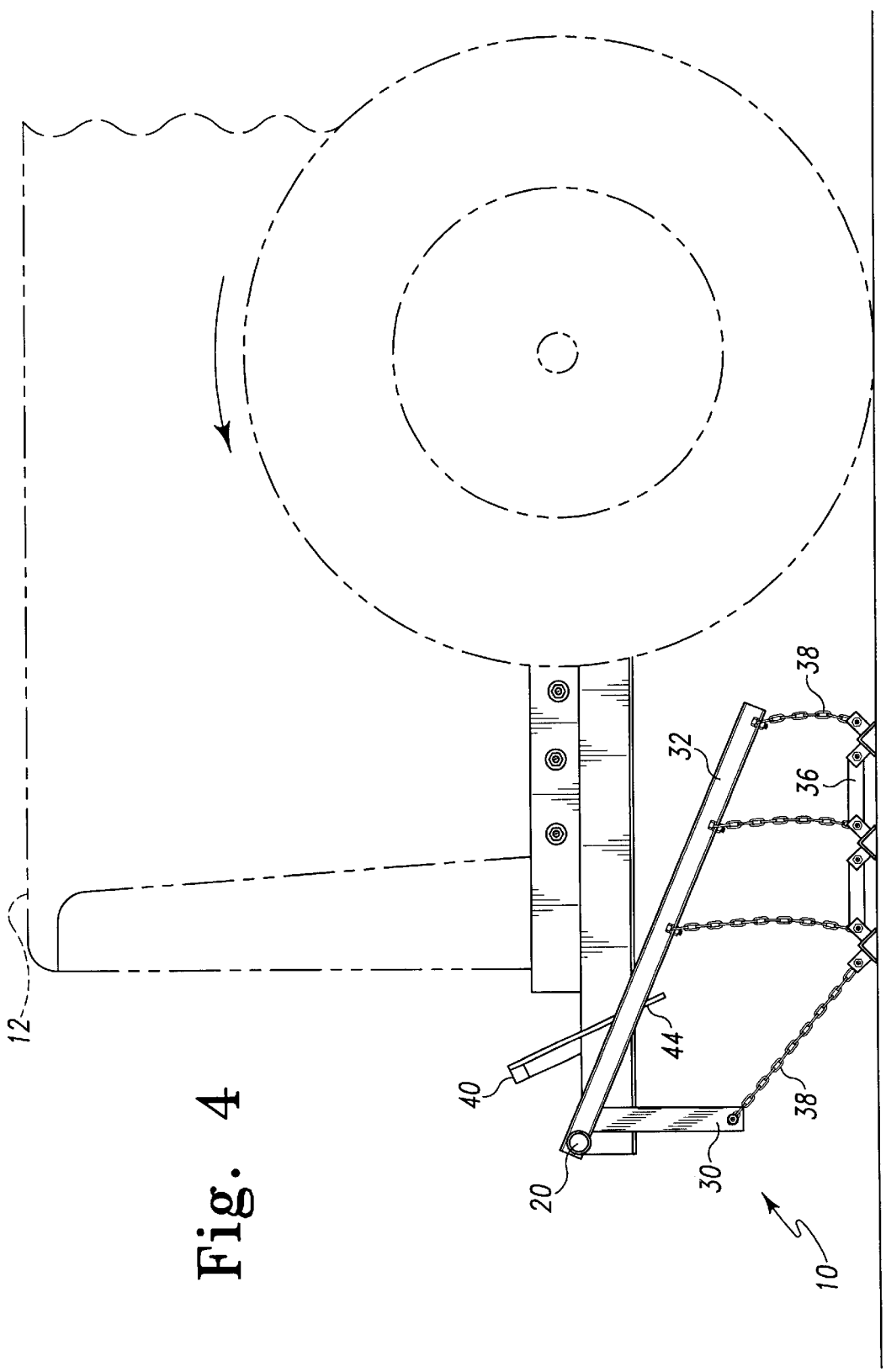
FIG. 4 is a side-elevational view of the preferred embodiment of the present invention attached to a tractor and shown in the lowered position with the tractor moving forward.
Figure 5:
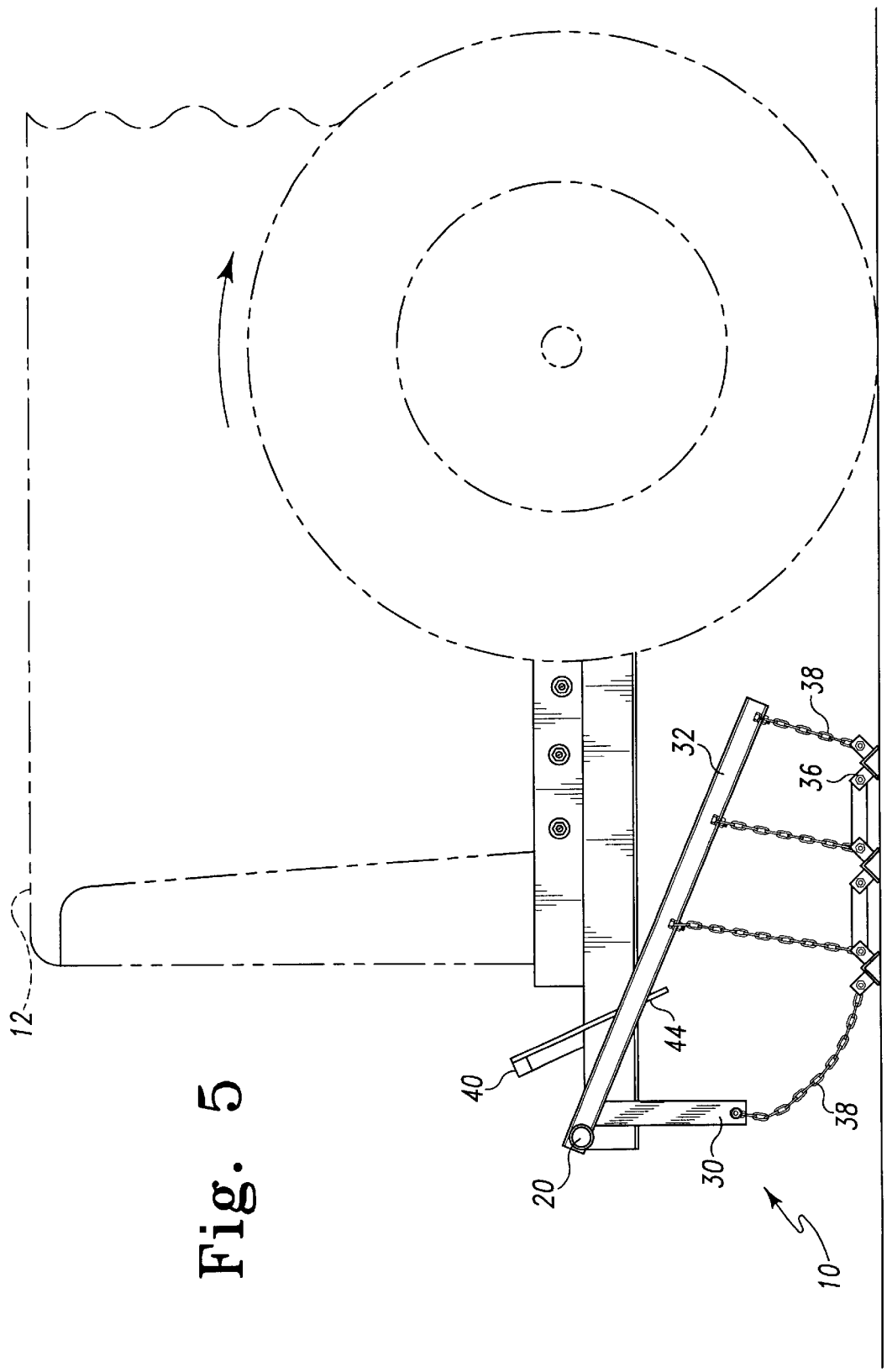
FIG. 5 is a side-elevational view of the preferred embodiment of the present invention attached to a tractor and shown in the lowered position with the tractor moving rearward.
Figure 6:
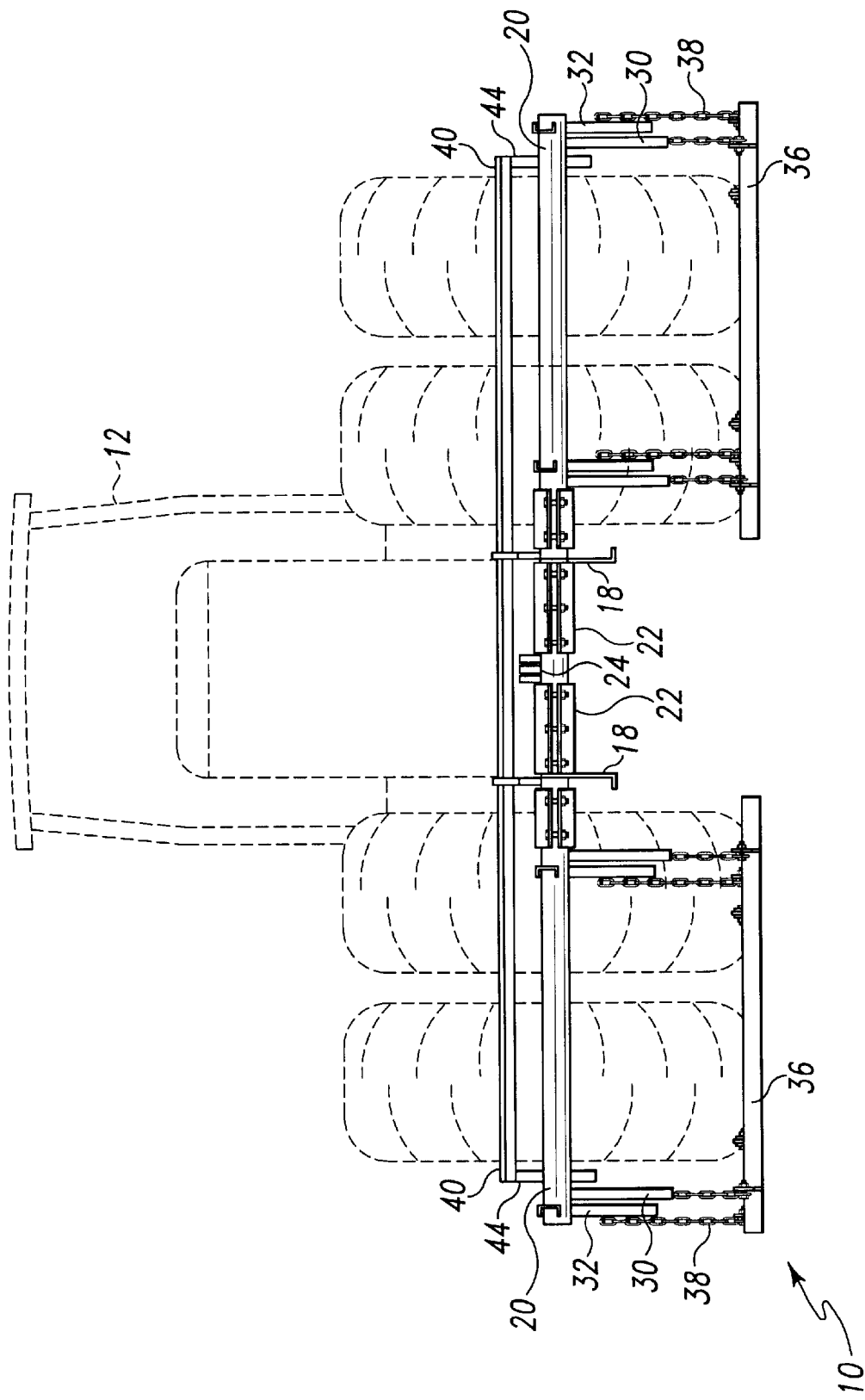
FIG. 6 is a front-end elevational view of the preferred embodiment of the present invention attached to a tractor.

Referring now to FIG. 4, the apparatus 10 is illustrated in the lowered position (drag unit 36 resting upon the ground) with the tractor 12 moving in the forward direction. It can be seen that the connecting member 38 extending between the lead arm 30 and the drag unit 36 limits rearward travel of the drag unit 36. This limitation on the rearward travel of the drag unit 36 while the vehicle is in forward motion prevents any possible interference between the drag unit 36 and the tires of the tractor 12. FIG. 5 illustrates the apparatus 10 position when the tractor 12 is moving in a rearward direction. In this position, the connecting member 38 between the lead arm 30 aid the drag unit 36 is slack, however, the connecting members 38 between the trailing arm 32 and the drag unit 36 are taut. This limits forward movement of the drag unit 36 while the tractor 12 is traveling in a rearward direction. FIG. 6 illustrates the apparatus 10 from the front of the tractor 12. As can be seen, it is preferred that each of the drag units 36 are at least as wide as the tire(s) positioned behind the drag unit 36. This ensures that any stubble in the field is folded over by the drag unit 36 prior to contact therewith by the tire of the tractor 12.

Figure 7:
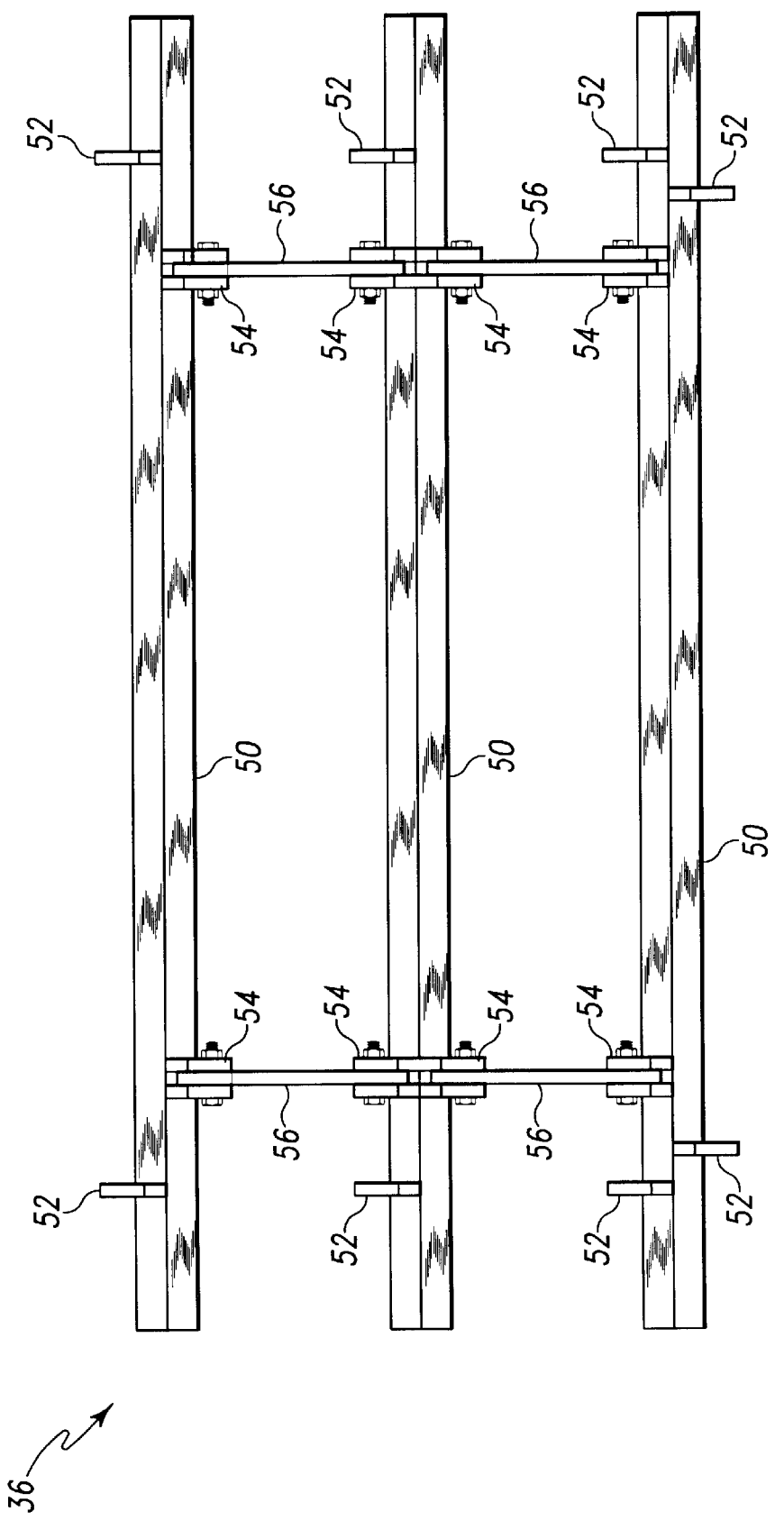
FIG. 7 is a top plan view of a preferred embodiment dragging unit of the present invention.
Figure 8:
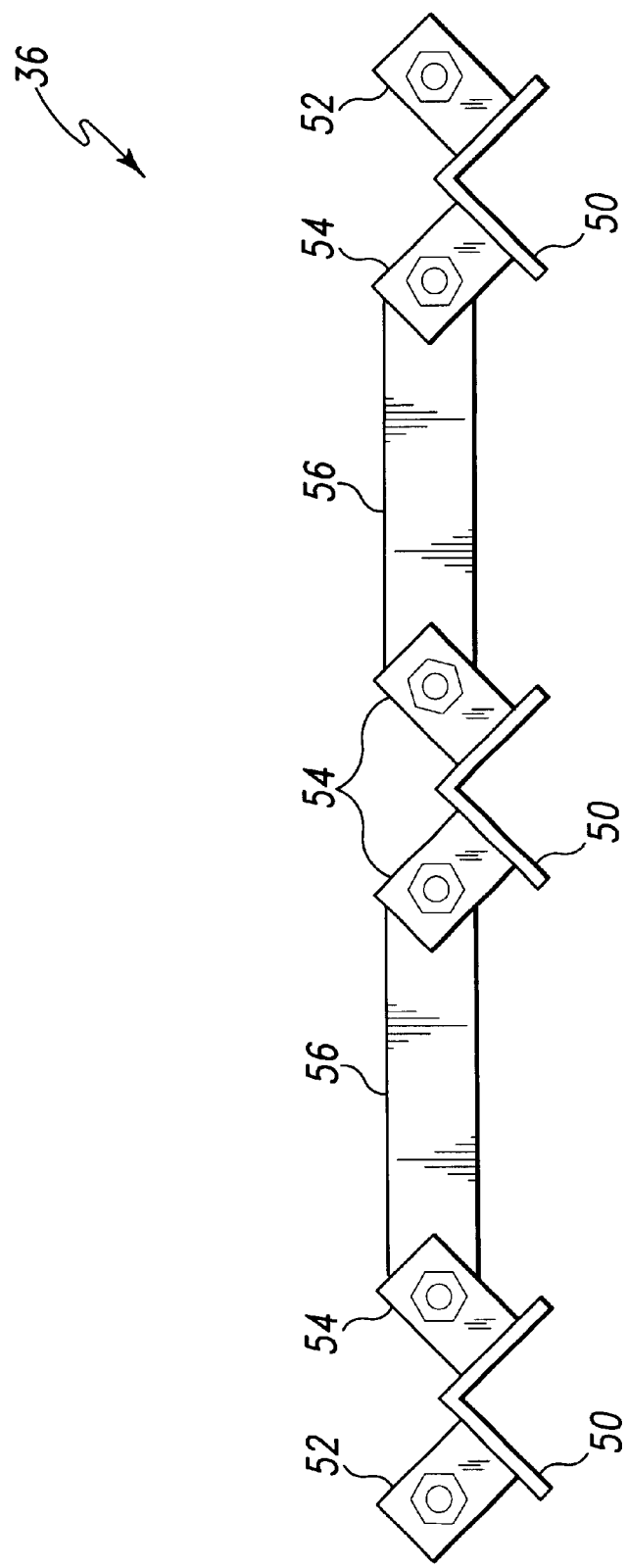
FIG. 8 is an end elevational view of the preferred embodiment dragging unit of FIG. 7.

Referring now to FIGS. 7 and 8, a preferred embodiment of the drag unit 36 of the present invention is illustrated in greater detail. Each drag unit 36 is preferably composed of three pieces of two-inch by three-inch by one-quarter-inch angle iron 50. Each piece of angle iron 50 includes several brackets 52 welded thereto which allow connection to the connecting members 38, preferably by means of a nut and bolt combination. Each piece of angle iron 50 includes further brackets 54, which allow for coupling of a drag unit joint bar 56 therebetween. There are preferably two joint bars 56 coupling each piece of angle iron 50 to each of its immediate neighbors. Rotatable couplings are preferably utilized between the brackets 54 and the joint bars 56 in order to allow vertical movement of the angle irons 50 with respect to one another as the drag bar 36 moves across uneven terrain. This minimizes the tendency of the drag bar 36 to be lifted off the ground as the leading edge of the drag bar 36 moves over an obstacle. By providing rotatable couplings between the joint bars 56 and the brackets 54, the drag bar 36 deforms itself in order to maintain close contact with the ground as it moves over obstacles. Although the jointed drag bar 36 illustrated in FIGS. 7 and 8 is preferred, the present invention does comprehend the use of a non-jointed drag bar 36.

It will be appreciated from the above description that the apparatus 10 of the present invention is effective in folding over field stubble, such as corn stalks and the like, prior to their interaction with the tractor tires. By folding the stubble over prior to such interaction, abrasion of the tires is greatly reduced or substantially eliminated.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. For example, specific materials are disclosed for each of the components of the preferred embodiment, however those having ordinary skill in the art will recognize that the materials used are not critical, so long as the materials chosen are adequate in view of the required performance of the component.

What is claimed:

1. An apparatus suitable to be affixed to a tractor, comprising:
    a dragging unit;
    a mounting element, adapted be affixed to the tractor;
    at least one connecting member adapted to affix said dragging unit to said mounting element; said at least one connecting member being substantially perfectly compressible;
    wherein the apparatus is configured to position said dragging unit so as to contact a piece of the ground before a tire of the tractor; and
    wherein all paths of connection between the tractor and said dragging unit pass through said at least one connecting member.

2. The apparatus of claim 1, wherein said at least one substantially perfectly compressible connecting member comprises a plurality of chains.

3. The apparatus of claim 1, wherein said at least one substantially perfectly compressible connecting member comprises a plurality of cables.

4. The apparatus of claim 1, further comprising:
    an actuator coupled to the tractor and adapted to move said dragging unit between at least a first position and a second position.

5. The apparatus of claim 4, wherein said mounting element operates to couple said actuator to the tractor.

6. The apparatus of claim 4, wherein said actuator is a hydraulic cylinder.

7. The apparatus of claim 1, where in said at least one substantially perfectly compressible connecting member is adapted to permit the dragging unit to drag on the ground without interfering With the contact of the ground with tires of the tractor when the tractor moves in any direction.

8. The apparatus of claim 1, wherein said at least one substantially perfectly compressible connecting member comprises a first connecting member and a second connecting member, each having a distal end affixed to the dragging unit and a proximal end, said proximal end of said first connecting member being affixed to a first anchor point and said proximal end of said second connecting member being affixed to a second anchor point, said first and second anchor points being positioned on a portion of the apparatus other than the dragging unit; and
    wherein said dragging unit has a dragging length defined by a shortest distance between an anterior edge and a posterior edge, the anterior edge and posterior edge being defined relative to a preferred direction of motion of the tractor; and
    wherein said first connecting member has a length less than the difference between a first wheel distance and said dragging length; and
    wherein said second connecting member has a length less than the difference between a second wheel distance and said dragging length; and
    wherein said first wheel distance is defined by a shortest distance between said first anchor point and a point at which a wheel of the tractor contacts the ground when the apparatus is affixed to the tractor and said second wheel distance is defined by a shortest distance between said second anchor point when the apparatus is affixed to the tractor.

9. The apparatus of claim 1, wherein said mounting element comprises a crossbar transverse to a preferred direction of motion of the tractor.

10. The apparatus of claim 1, further comprising lead and trailing arms coupled to said mounting element, and wherein each of said at least one connecting member is affixed to one of said lead and trailing arms.

11. An apparatus suitable to be affixed to a tractor, comprising:
    a dragging unit;
    a mounting element, adapted be affixed to the tractor;
    at least one connecting member adapted to affix said dragging unit to said mounting element; said at least one connecting member being substantially perfectly compressible;
    an actuator coupled to the tractor and adapted to move said dragging unit between at least a first position and a second position; and a gauge bar adapted to indicate to a user when the dragging unit is in said first position;

wherein the apparatus is configured to position said dragging unit so as to contact a piece of the ground before a tire of the tractor.

12. An apparatus suitable to be affixed to a tractor, comprising:

a dragging unit;

a mounting element, adapted be affixed to the tractor; and at least one connecting member adapted to affix said dragging unit to said mounting element; said at least one connecting member being substantially perfectly compressible;

wherein said dragging unit comprises a plurality of dragging elements affixed to one another by rotatable couplings so as to be free to rotate relative to one another about an axis parallel to the ground and perpendicular to a preferred direction of motion of the tractor; and wherein the apparatus is configured to position said dragging unit so as to contact a piece of the ground before a tire of the tractor.

13. The apparatus of claim 12, wherein said dragging elements comprise at least one piece of angle iron.

14. The apparatus of claim 12, wherein said dragging elements are affixed to one another by at least one joint bar.

15. An apparatus suitable to be affixed to a tractor, comprising:

a dragging unit;

a mounting element, adapted be affixed to the tractor;

at least one connecting member adapted to affix said dragging unit to said mounting element; said at least one connecting member being substantially perfectly compressible;

an actuator adapted to move said dragging unit between at least a first position and a second position; and a gauge bar adapted to indicate to a user when the dragging unit is in said first position;

wherein the apparatus is configured to position said dragging unit so as to contact a portion of the ground before a tire of the tractor.

16. An apparatus suitable to be affixed to a tractor, comprising:

a dragging unit, comprising
    a plurality of dragging units, each comprising at least one piece of angle iron; and
    at least one joint bar affixed to a plurality of said dragging units and adapted to permit said dragging units to rotate with respect to each other in an axis parallel to the ground and perpendicular to a preferred direction of motion of the tractor;

a mounting plate, adapted be bolted to the tractor;

at least one connecting member adapted to affix said dragging unit to said mounting plate; said at least one connecting member being substantially perfectly compressible;

an actuator adapted to move said dragging unit between at least a first raised position and a second lowered position;

a gauge bar adapted to indicate to a user when the dragging unit is in said first position; and wherein the apparatus is configured to position said dragging unit so as to contact a portion of the ground before a tire of the tractor.

* * * * *